Sept. 20, 1971     K. WILFERT ET AL     3,605,932
STEERING SYSTEM FOR MOTOR VEHICLES
Filed April 2, 1969     3 Sheets-Sheet 1
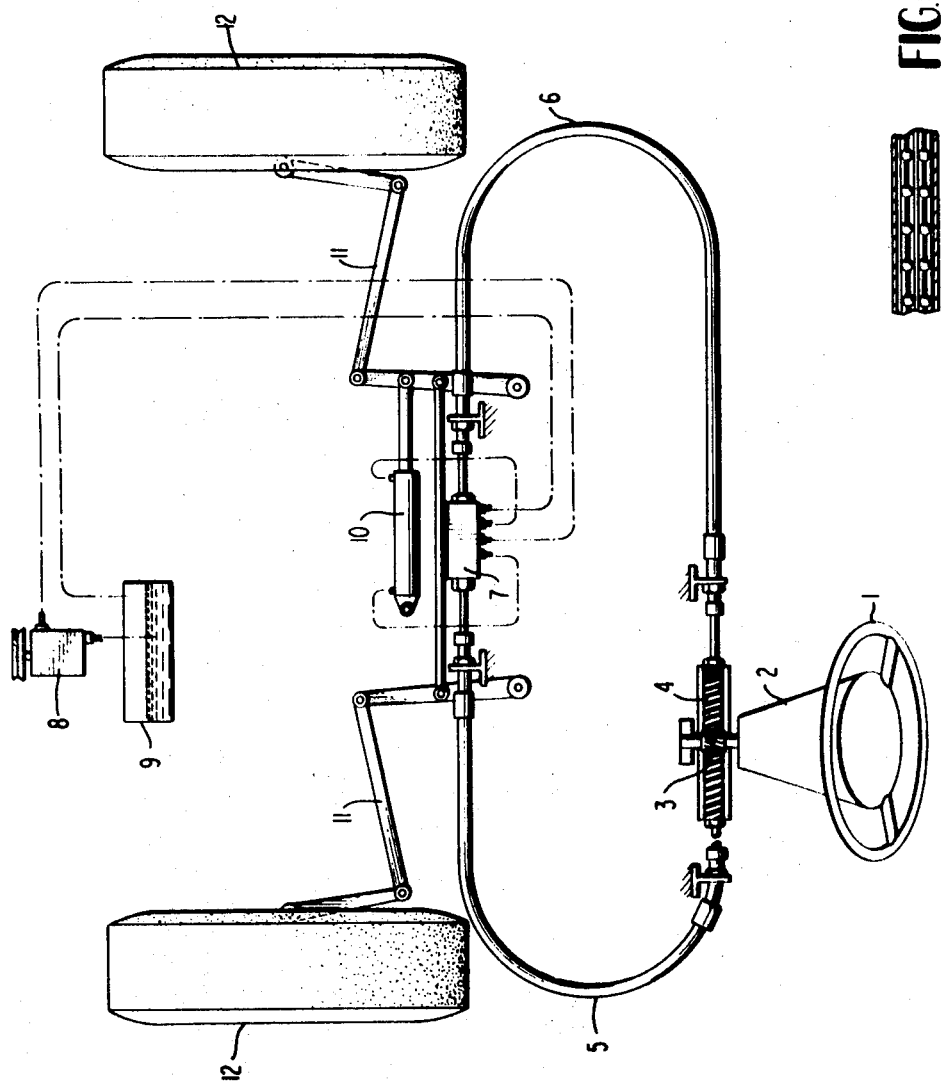
INVENTORS
KARL WILFERT
RUDOLF ANDRES
ATTORNEYS Sept. 20, 1971     K. WILFERT ET AL     3,605,932

STEERING SYSTEM FOR MOTOR VEHICLES

Filed April 2, 1969     3 Sheets-Sheet 2

INVENTORS
KARL WILFERT
RUDOLF ANDRES

BY *Craig, Antonelli, Stewart & Hill*

ATTORNEYS

Sept. 20, 1971    K. WILFERT ET AL    3,605,932
STEERING SYSTEM FOR MOTOR VEHICLES
Filed April 2, 1969    3 Sheets-Sheet 3

INVENTORS
KARL WILFERT
RUDOLF ANDRES

BY *Craig, Antonelli, Stewart & Hill*

ATTORNEYS

United States Patent Office 3,605,932
Patented Sept. 20, 1971

3,605,932
STEERING SYSTEM FOR MOTOR VEHICLES
Karl Wilfert, Gerlingen-Waldstadt, and Rudolf Andres, Sindelfingen, Germany, assignors to Daimler-Benz Aktiengesellschaft, Stuttgart-Unterturkheim, Germany
Filed Apr. 2, 1969, Ser. No. 812,728
Claims priority, application Germany, Apr. 3, 1968, P 17 55 136.9; June 8, 1968, P 17 55 685.3
Int. Cl. B62d 5/06
U.S. Cl. 180—79.2R     19 Claims

ABSTRACT OF THE DISCLOSURE

A steering system for motor vehicles which operates with an auxiliary force assist and in which flexible mechanical connecting elements are used for the transmission of the steering wheel movements; one such flexible connecting element is provided for each actuation direction of the steering system and is so designed that the force necessary for the steering can also be transmitted thereby in case of failure of the auxiliary force.

The present invention relates to a steering system for motor vehicles which operates by means of an auxiliary force assist and in which flexible mechanical connecting elements are utilized for the transmission of the steering wheel movements.

With the customary motor vehicle steering systems, the steering forces are transmitted from the steering wheel by way of a steering spindle, either directly or by way of an auxiliary force mechanism, to the steering linkage and therewith to the wheels. In connection therewith, the space for the steering spindle has to be kept free which with the strongly increased number in recent years of auxiliary aggregates oftentimes causes difficulties, especially with engines arranged in the front of the vehicle. Further complicating the matter is frequently the fact that a percentage of the vehicles, even if only a relatively small percentage, has to be supplied with a right-hand steering so that also on the right vehicle side a corresponding space for the steering spindle has to be left free.

Furthermore, the steering spindles of most of the motor vehicles are so constructed in recent times that in case of collisions they cannot be pushed into the interior of the vehicle. Such types of construction, however, represent also a considerable increase in the cost of the steering systems.

A servo-steering or power-steering installation has already been proposed in which a control slide valve is adjustable by way of a Bowden cable to be actuated by means of the steering wheel. The difficulty with such types of steering systems, however, resides in that only relatively small pressure forces can be transmitted by a Bowden cable. It has therefore been proposed already heretofore to decrease as much as possible the forces necessary for the actuation of the corresponding control slide valves; however to date such prior art types of steering systems have not been able to find acceptance in practice. A further disadvantage of such types of steering systems, in fact, additionally resides in that in case of failure of the auxiliary force installation, the forces then to be applied for the steering of the vehicle which alternate in their direction, cannot be transmitted under any circumstances by way of a Bowden cable.

The present invention therefore aims at avoiding the disadvantages of the aforementioned steering systems and at creating a steering system assisted by an auxiliary force which is constructed in a simple manner and whose parts can be readily installed in the vehicle, in which also in case of breakdown or failure of the auxiliary force a completely satisfactory steerability of the vehicle is assured, and which during accidents contributes considerably to the protection of the vehicle passengers.

Accordingly, a steering system for motor vehicles which operates with auxiliary force assist and in which flexible connecting elements are used for the transmission of the steering wheel movements, is proposed in which, according to the present invention, for each actuation direction of the steering at least one flexible connecting element each is provided which is so dimensioned that also in case of failure of the auxiliary force, the force necessary for the steering can be transmitted.

According to one preferred embodiment of the present invention, the steering movements are transmitted directly to the rear of the steering wheel or to the rear of a deformation member arranged adjoining the steering wheel to connecting elements loaded essentially only in tension with elimination of the usual steering spindle.

The transmission of the steering movements to the flexible connecting elements can thereby take place advantageously by way of a toothed rack in meshing engagement with a pinion.

With a steering system, for which a hydraulic auxiliary force installation is provided, a steering work-element can be controlled advantageously by a servo-valve of the auxiliary force installation.

In order to assure a shock-free operation of the steering system, damping bodies may be provided in the control lines between servo-valve and steering work-element.

In order to be able to reduce the play of the flexible connecting elements as much as possible, the connecting elements may be connected under prestress with a clamping piece, from which the transmission of the steering movements to the servo-valve takes place by way of an intermediate lever.

In order to eliminate completely the play of the flexible connecting elements during the actuation of the servo-valve, the latter can be actuated advantageously by way of the steering wheel without interconnection of flexible connecting elements.

For that purpose, a pinion may be secured at the steering wheel shaft which engages in a toothed rack that is connected with a connecting member for the flexible connecting elements in such a manner that a longitudinal displacement of the two structural parts with respect to each other is possible which corresponds to the shifting path of the servo-valve arranged between the toothed rack and connecting member.

However, the servo-valve may also be fixedly arranged and can be actuated by a cross movement of the steering wheel shaft or by axial displacement of the steering wheel shaft or a part thereof.

Accordingly, it is an object of the present invention to provide a steering system for motor vehicles which eliminates by simple and operationally reliable means for aforementioned drawbacks and shortcomings encountered in the prior art.

Another object of the present invention resides in a steering system for motor vehicles which eliminates the need for steering spindles and thereby simplifies the spatial layout of the engine compartment.

A further object of the present invention resides in a steering system which is simple in construction, relatively inexpensive in manufacture and assembly and extraordinarily reliable in operation.

Still a further object of the present invention resides in a steering system for motor vehicles of the type described above, which is able to transmit the steering forces in a completely satisfactory manner without the need for a steering spindle even in case of failure of the power steering system.

These and further objects, features and advantages of the present invention will become more obvious from the following description when taken in connection with the accompanying drawing which shows, for purposes of illustration only, several embodiments in accordance with the present invention, and wherein:

FIG. 1 is a schematic view of a steering system in accordance with the present invention;

FIGS. 1A and 1B are partial views showing in cross section two possible constructions for the mechanical connections in accordance with the present invention;

Figure 2:
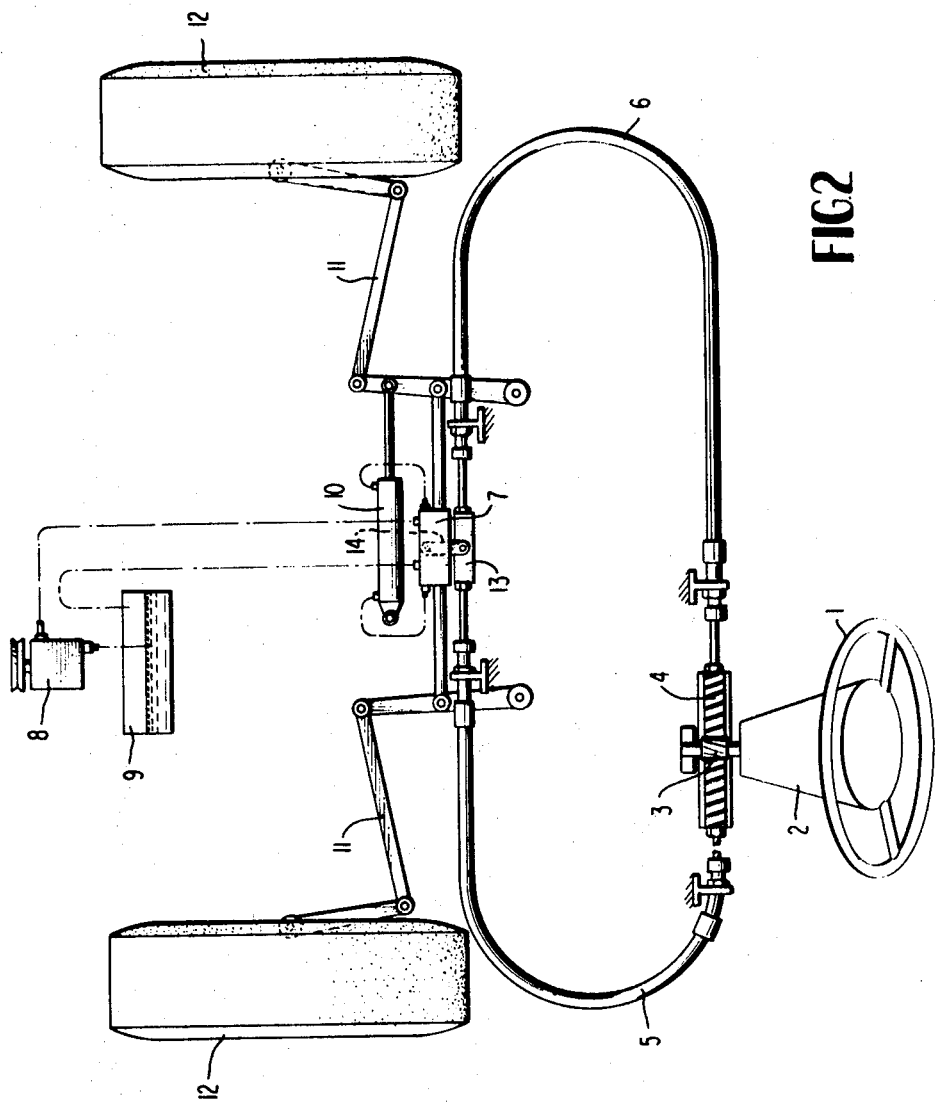
FIG. 2 is a schematic view, similar to FIG. 1, of a modified embodiment of a steering system in accordance with the present invention.

Referring now to the drawing wherein like reference numerals are used throughout the various views to designate like parts, and more particularly to FIG. 1, the steering movements of the steering wheel 1, which is adjoined by the deformation member 2 of any conventional construction, are transmitted to a toothed rack 4 by way of a pinion 3; one flexible connection 5 and 6 adjoins a respective one of the two sides of the toothed rack 4. The flexible connections 5 and 6 lead to a servo-valve 7 which is supplied with pressure liquid from a supply tank 9 by way of a pump 8 and is operatively connected with the steering linkages 11 on the left- and right-hand sides. The two piston sides of a steering work-element 10 are alternately loaded by way of the servo-valve 7 which is to operate with the smallest possible shifting paths, for example, of the order of magnitude of 0.4 mm. The steering work-element 10 of conventional construction acts on the steering linkage 11 and thus influences the steering deflection of the wheels 12.

Possible types of construction of the flexible connections are illustrated in cross section in FIGS. 1A and 1B.

In the embodiment of the present invention illustrated in FIG. 2, a far-reachingly play-free transmission of the steering wheel movements is made possible. This is achieved in that the flexible connections 5 and 6 are connected under prestress with a clamping or tensioning member 13, from which the transmission of the steering movements to the servo-valve 7 takes place by way of an intermediate lever 14.

Figure 3:
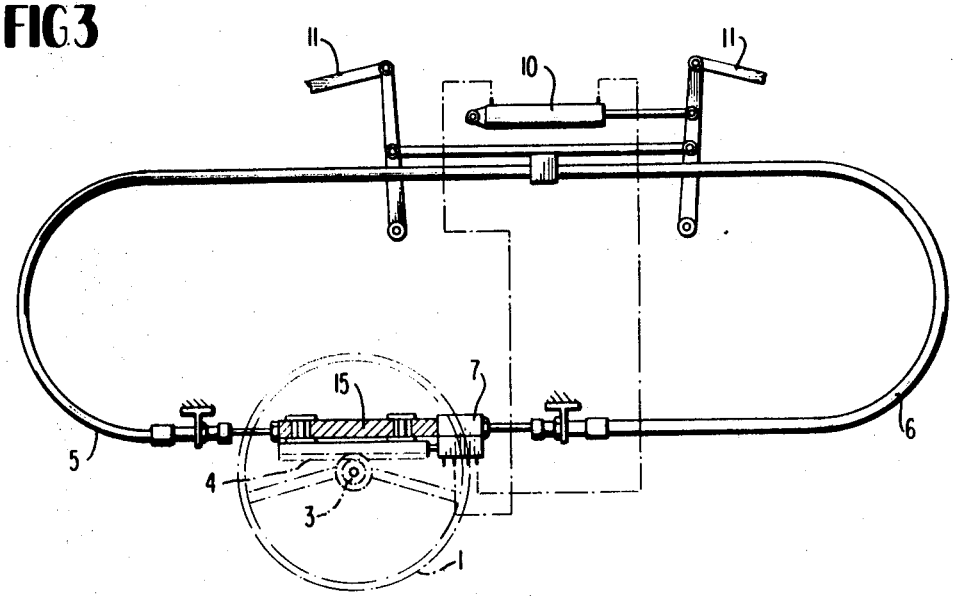
FIGS. 3 and 4 are schematic views of two further modified embodiments of a steering system in accordance with the present invention in which the servo-valve of the auxiliary force installation is actuated without interposition of flexible connecting elements.

In the embodiment of the present invention illustrated in FIG. 3, a pinion 3, which is secured at the steering wheel shaft, meshes with a toothed rack 4. A connecting member 15 for the flexible connecting elements 5 and 6 is disposed above the toothed rack 4. The toothed rack 4 and the connecting member 15 are so connected with each other that a longitudinal displacement of the two structural parts with respect to each other is possible. The possible longitudinal displacement is thereby as large as the shifting path of the servo-valve 7 arranged between toothed rack 4 and connecting piece 15. If now a steering movement is carried out at the steering wheel 1, then at first the toothed rack 4 is displaced by way of the pinion 3 which in turn opens the servo-valve 7 since the response-force of the valve is smaller than the necessary steering force at the connecting member 15. A reaction force corresponding to the oil pressure of the steering work-element 10 controlled by the servo-valve 7 acts in opposition to the opening force of the servo-valve 7. This reaction force introduces or repeats to the steering wheel the change of the steering force.

Figure 4:
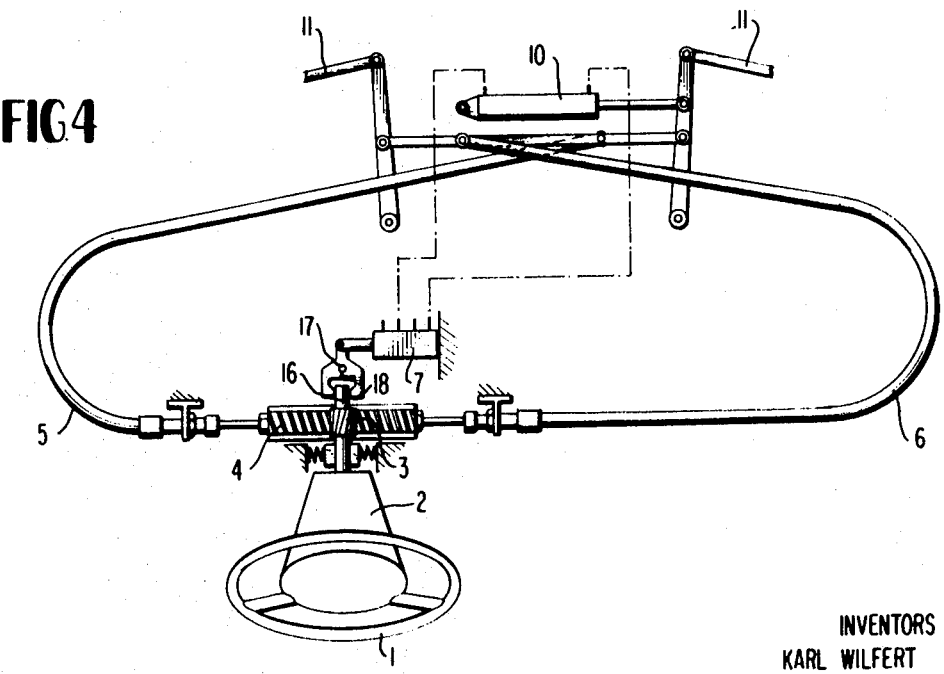

In the embodiment according to FIG. 4, the servo-valve 7 is arranged stationary so that, contrary to the embodiment described above, no flexible connecting elements need to be connected at the servo-valve 7. The actuation of the servo-valve 7 takes place in this case by a cross movement of the correspondingly displaceably supported steering wheel shaft 16 which acts on the servo-valve 7 by way of a connecting lever 18 pivotal about a pivot point 17.

It is, however, also possible within the frame of the present invention to utilize in the place of the illustrated connections, cables guided by rollers or correspondingly guided chains.

The flexible connecting elements may also be provided each in duplicate for an increase in the operating safety.

In lieu of a steering system operating according to the oil circulatory principle, as is illustrated in the accompanying drawing, the oil supply of the servo-valve may also take place by way of a pressure tank.

Additionally, any conventional mechanical means connecting either or both the connecting member 5 and 6 with a respective steering linkage 11 may be provided to permit transmission of the steering movements in case of failure of the servo-power.

While we have shown and described several embodiments in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are within the scope of those skilled in the art.

We claim:

1. A steering system for motor vehicles which operates with an auxiliary servo-force assist and in which flexible mechanical connecting means are used for the transmission of steering wheel movements, characterized in that at least one flexible mechanical connecting means is operatively connected between the steering wheel and linkage means of the wheels to be steered and is provided for each actuation direction of the steering system which is so dimensioned that the forces necessary for the steering can be transmitted thereby also in case of failure of the auxiliary servo-force assist or one of the flexible mechanical connecting means.

2. A steering system according to claim 1, characterized in that means is provided for transmitting directly the steering movement of the steering wheel to the connecting means which are stressed essentially only in tension thereby eliminating the customary steering spindle.

3. A steering system according to claim 2, wherein the steering movements are transmitted to the connecting means directly to the rear of a deformation member adjoining the steering wheel.

4. A steering system according to claim 2, wherein the means for direct transmission of the steering movements to flexible connecting means includes a toothed rack in meshing engagement with a pinion.

5. A steering system according to claim 2, in which hydraulic auxiliary force installation is provided, characterized in that a steering work-element of the auxiliary force installation is controlled by a servo-valve means thereof.

6. A steering system according to claim 5, characterized in that damping means are provided in control lines between the servo-valve means and the steering work-element.

7. A steering system according to claim 6, characterized in that the flexible connecting means are connected under prestress with a clamping member, from which the transmission of the steering movements to the servo-valve means takes place by way of an intermediate lever.

8. A steering system according to claim 6, characterized in that servo-valve means is actuated by the steering wheel without interposition of flexible connecting means.

9. A steering system according to claim 8, characterized in that the direct transmission means includes a pinion secured at the steering wheel shaft which meshes with a toothed rack that is operatively connected with a connecting member for the two flexible connecting means in such a manner that a longitudinal displacement of the two structural parts consisting of toothed rack and connecting member with respect to each other is possible which corresponds substantially to the shifting path between toothed rack and connecting member.

10. A steering system according to claim 8, wherein said servo-valve means is stationary and is actuated by cross movements of the steering wheel shaft.

11. A steering system according to claim 8, characterized in that the servo-valve means is stationary and is actuated by axial displacement of a part of the steering wheel shaft.

12. A steering system according to claim 1, wherein the transmission of the steering movements to the flexible connecting means takes place by way of a toothed rack in meshing engagement with a pinion.

13. A steering system according to claim 1, in which a hydraulic auxiliary force installation is provided as the servo-force assist, characterized in that a steering work-element of the auxiliary force installation is controlled by a servo-valve means thereof.

14. A steering system according to claim 13, characterized in that damping means are provided in control lines between the servo-valve means and the steering work-element.

15. A steering system according to claim 13, characterized in that the flexible connecting means are connected under prestress with a clamping member, from which the transmission of the steering movements to the servo-valve means take place by way of a intermediate lever.

16. A steering system according to claim 13, characterized in that the servo-valve means is actuated by the steering wheel without interposition of flexible connecting means.

17. A steering system according to claim 16, wherein said servo-valve means is stationary and is actuated by cross movements of the steering wheel shaft.

18. A steering system according to claim 16, characterized in that the servo-valve means is stationary and is actuated by axial displacement of a part of the steering wheel shaft.

19. A steering system according to claim 13, characterized in that the direct transmission means includes a pinion secured at the steering wheel shaft which meshes with a toothed rack that is operatively connected with a connecting member for the two flexible connecting means in such a manner that a longitudinal displacement of the two structural parts consisting of toothed rack and connecting member with respect to each other is possible which corresponds substantially to the shifting path between toothed rock and connecting member.

References Cited

UNITED STATES PATENTS

| | | | |
|---|---|---|---|
| 3,208,300 | 9/1965 | Morse | 74—501 |
| 3,414,072 | 12/1968 | Hodges et al. | 180—79.2 |
| 3,419,103 | 12/1968 | McMillen | 180—79.2 |
| 3,464,286 | 9/1969 | McCabe | 74—501 |

LEO FRIAGLIA, Primary Examiner

J. A. PEKAR, Assistant Examiner

U.S. Cl. X.R.

74—501; 280—96